US007612843B2

(12) United States Patent
Chou

(10) Patent No.: US 7,612,843 B2

(45) Date of Patent: Nov. 3, 2009

(54) STRUCTURE AND DRIVE SCHEME FOR LIGHT EMITTING DEVICE MATRIX AS DISPLAY LIGHT SOURCE

(76) Inventor: Chen-Jean Chou, 21 Ridgefield Rd., New City, NY (US) 10956

(*) Notice: Subject to any disclaimer, the term of this patent is extended or adjusted under 35 U.S.C. 154(b) by 264 days.

(21) Appl. No.: 11/754,268

(22) Filed: May 25, 2007

(65) Prior Publication Data

US 2008/0170054 A1 Jul. 17, 2008

Related U.S. Application Data

(60) Provisional application No. 60/767,534, filed on May 25, 2006.

(51) Int. Cl.
*G02F 1/1335* (2006.01)
*G06F 3/038* (2006.01)

(52) U.S. Cl. ........................................ 349/61; 345/205

(58) Field of Classification Search .................. 349/61; 345/205

See application file for complete search history.

(56) References Cited

U.S. PATENT DOCUMENTS

| | | | | |
|---|---|---|---|---|
| 7,187,391 | B2 * | 3/2007 | Itoh et al. | 345/629 |
| 7,202,613 | B2 * | 4/2007 | Morgan et al. | 315/312 |
| 2007/0296886 | A1 * | 12/2007 | Inada et al. | 349/61 |

* cited by examiner

*Primary Examiner*—Mike Qi

(57) ABSTRACT

A system and driving method are provided to accurately reproduce an input image using calibrated intensity profile. Extended dynamic range can be obtained according to the computation method. Improved structures for solid-state backlighting system suitable for such application are provided.

51 Claims, 13 Drawing Sheets

STRUCTURE AND DRIVE SCHEME FOR LIGHT EMITTING DEVICE MATRIX AS DISPLAY LIGHT SOURCE

CROSS REFERENCE TO RELATED APPLICATIONS

The present application claims priority of U.S. Provisional Patent Application No. 60/767,534, filed on May 25, 2006, which is hereby incorporated by reference.

BACKGROUND OF THE INVENTION

1. Field of the Invention

The present invention relates to a display comprising a light-emitting device array and a drive scheme to operate such. More specifically, the present invention provides a method to operate the light emitting device array in response to a stream of input image data to provide dynamic control of light emitting device array to deliver a composite image on a front panel.

2. Description of the Prior Art

Conventional liquid crystal displays (LCD), or similar light modulating displays, typically operate with an array of liquid crystal light valves modulating the light from a static light source. Dynamically controlled light sources have been proposed to operate in conjunction with the light modulators to deliver enhanced image quality where the light source intensity is controlled in accordance with the image data. It is perceivable that a better image enhancement is achieved with a higher degree of partition of dynamically varied light sources. For example, a greater benefit of image enhancement can be obtained in a multiple partition of controlled light sources than a single controlled source illuminating the entire screen. Similarly, a greater power efficiency is achievable in systems that comprises higher degree of partitioned light sources.

Dynamic control of light source in the real time requires light sources responding fast enough to varying drive current as to synchronize with the refreshing image data. In this regard, a light source based on light emitting diode (LED) offers a greater advantage than a cold cathode fluorescent lamp (CCFL), as the response time of LEDs is orders of magnitude faster than CCFL.

Light emitting diodes have been used in display applications as lighting elements, either as direct light emitting image pixels or as light sources from which the light is modulated by light modulators such as LCD light valves. Examples of the first application includes organic light emitting diode display (OLED) and discrete LED billboard. An example of second application is LED backlight. In all such display systems, a common challenge is the uniformity and stability of LED components. More specifically, the issue involves the requirement of a narrow distribution of initial spectra of the LEDs, as well as the controllability of subsequent time dependent decay. These issues have received substantial attention, but the current solutions are costly, or involves substantial technically complexity. This is especially so for a system comprising a large number of LED elements. For example, one current solution for the initial spectra control is sorting (binning) the LED elements and select specific spectral distribution for a certain product application. A solution for the time dependent decay, which varies from one LED element to another, and between different colors, is to construct build-in light sensors to detect the light output of selected LED elements. It is conceivable that a sorting procedure causes yield to drop and cost to increase. It is also conceivable that implementing sensor, while practical for a small number of LED elements, increases system complexity and cost substantially for a large LED system.

The present invention addresses these issues by providing a system solution which includes a structural aspect, a drive scheme aspect, and a system design aspect.

Examples of liquid crystal display (LCD) as light modulators and backlight construction are provided in U.S. Pat. No. 3,881,809, U.S. Pat. No. 4,540,243, U.S. Pat. No. 4,772,099, and U.S. Pat. No. 6,489,952, all of which are hereby incorporated by reference.

SUMMARY OF THE INVENTION

The present invention comprises architectures that provide a structure combining a matrix of LED and a matrix of light valves, such as LCD, to form a composite image display system. The matrix of LED may be an active matrix comprising individual current control circuit within each lighting unit, or connected to a peripheral driver circuit. More specifically, the system comprises a data storage device storing reference information corresponding to exiting light from the light valve matrix. Both the LED control signal and the light valve (or LCD) control signal are modulated by such reference information. The structure and operating method allow the image to be produced in high precision, both in intensity and color.

The present invention further comprises an image scanning scheme that provides a preferred method to address the combined system.

The present invention further provides a preferred structure for constructing high degree partitioned and controlled lighting elements for individual source control.

DETAILED DESCRIPTION OF THE INVENTION

The present invention is directed to the structure of a system comprising an array of light emitting device and an array of light modulators, and the operation methods of such display system. Preferred embodiments are explained in applications for display apparatus. The light emitting diode is used as the preferred embodiment for the light emitting device. The liquid crystal display (LCD) is used as the preferred embodiment of light modulator. For those skilled in the art, it is readily conceivable that any light emitting devices with sufficiently fast response time will work equally well in all For example, a bi-directional light emitting device or a fast response lamp may also be used as the light sources. In addition, the light valve is used as preferred embodiment for light modulator.

The present invention will hereinafter be described in detail with reference to the drawings.

Figure 1:
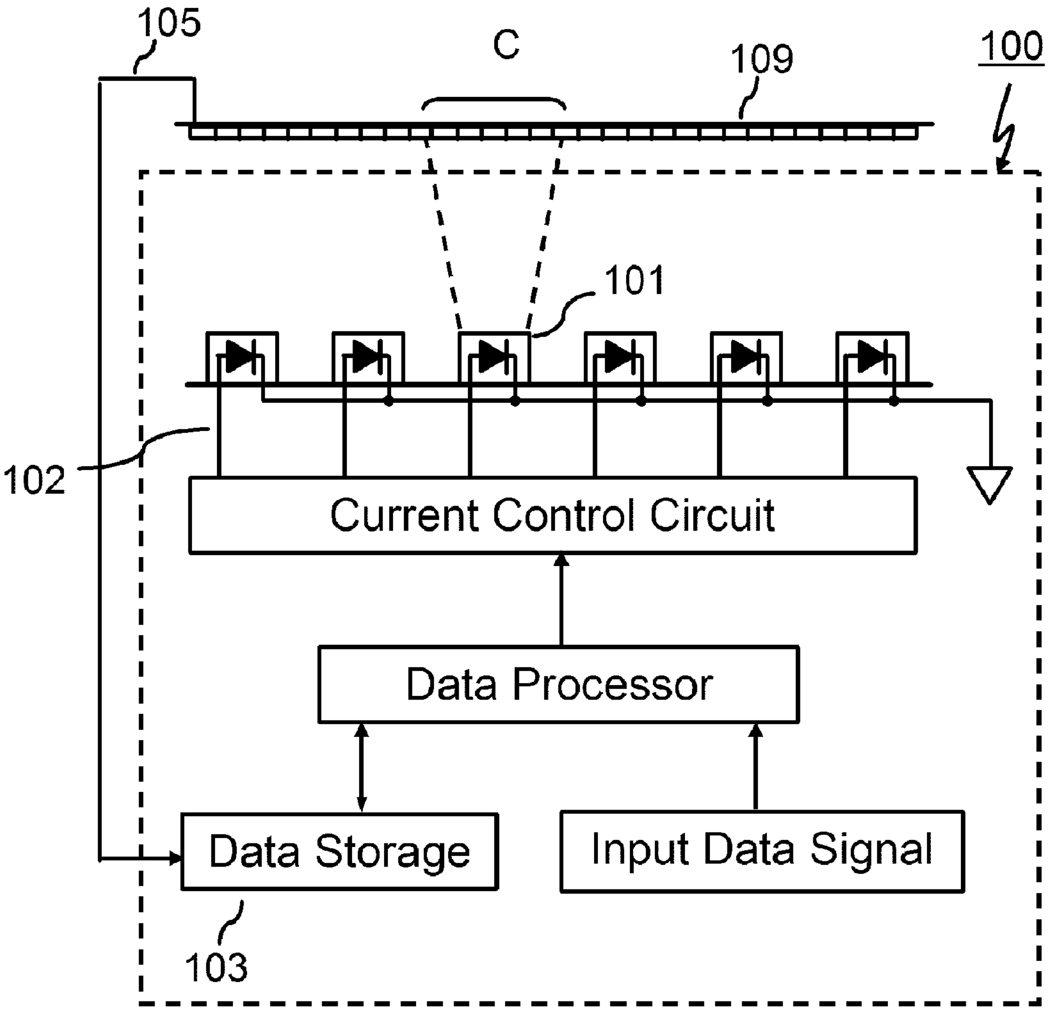
FIG. 1 is the schematic diagram of a preferred embodiment of the present invention.

FIG. 1 provides a schematic diagram of a preferred embodiment of a light emitting device display 100 of the present invention, wherein the display comprising an array of LED. The display 100 further comprises a current control circuit wherein each output channel 102 of said control circuit delivers a drive current to an LED 101, an EEPROM 103 as the data storage device to store the first reference information, a data processor to generate current control signal according to an input data signal. An LED 101 produces light output according to the drive current set by the control circuit. A preferred embodiment of the current control circuit comprises a commercially available current driver delivering output current modulated in amplitude or pulse width according to a data signal. The input data signal represents a set of data values corresponding to the desired brightness levels (gray scales) that the LEDs to be operated to display to a viewer. As the characteristics of LEDs may vary, the drive current directly converted from an input data signal by a current control circuit will typically result in a light output distorted by such variation, i.e. an output light intensity not proportionally representing the input data signal. Such deviation of light output may arise from both the variation of LED characteristics in electrical current at a given voltage and in light output at a given electrical current. One feature of the present invention provides a first reference information stored in the EEPROM 103 as part of a display system to adjust the drive current accordingly. This reference information is the measured output light intensity at a given current set by a given input data signal. A preferred input data signal for such setting is the highest gray level corresponding to the full bright level. In FIG. 1, a detachable sensor device 109 comprising an array of light sensing elements is illustrated. Sensor 109 is an external measuring device detachable from the system. A CCD camera may be used as a preferred measurement device. The measured intensity in the CCD array corresponding to a specific LED 101 at specific time during a drive period is sent via a data signal link 105, such as a data cable, to the data storage EEPROM 103. The timing of sending/receiving such data is synchronize with the timing of drive current by the control circuit. The data processor uses this stored reference information to re-process the input data signal with a scaling operation. A preferred embodiment of the function of the data processor is to perform a scaling of the input data signal according to the stored reference information.

As a preferred scaling operation of the data processor, given an array of input data signal (S1, S2, . . . , Sn) and an array of data value (R1, R2, . . . , Rn) as part of the reference information representing the maximum light output measured by sensor 109 when a respective LED is driven at a full scale (highest gray scale), the processor operates to produce a current driving signal (S1×R1, S2×R2, . . . , Sn×Rn)/M, where M is the maximum value of (R1 R2 . . . Rn). Such scaled current drive signal is then sent to current control circuit for generating drive current.

Figure 4:
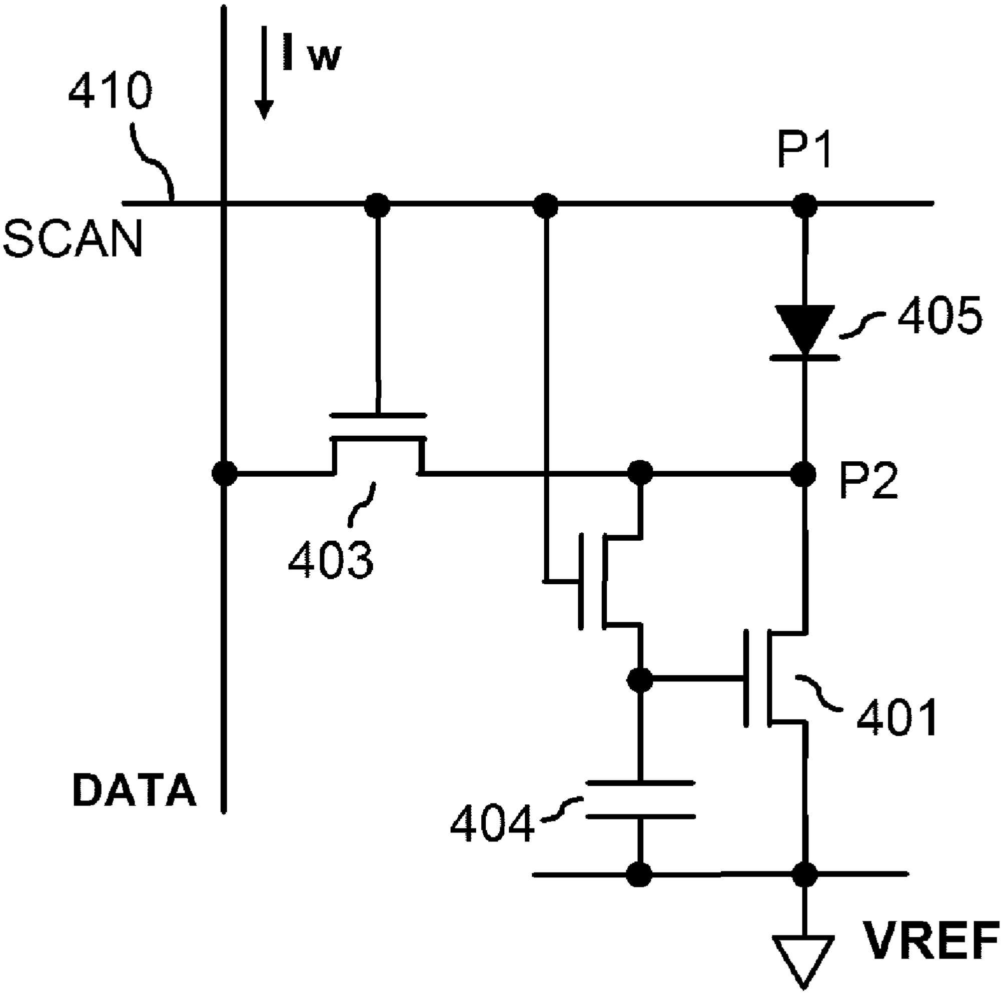
FIG. 4 is an example of a preferred embodiment of a light emitting device unit in an active matrix in the present invention.

As a preferred embodiment for FIG. 1, the LED array forms an active matrix wherein each unit cell comprises an LED element, a drive transistor, and a storage capacitor. An example of a unit circuit of such LED matrix is provided in FIG. 4, wherein a transistor 402 modulates the current directed to the LED 405 according to a data information stored in storage capacitor 404. The data information is written into the storage capacitor 404 from a data electrode when a data control transistor 403 is selected by the scan electrode 410.

FIG. 1*b* provide another preferred embodiment of LED array where each array is driven by a current source, wherein the current source is embedded in an integrated circuit and said integrated circuit further comprising control circuit for setting multiple levels of brightness according to an input signal.

Figure 2:
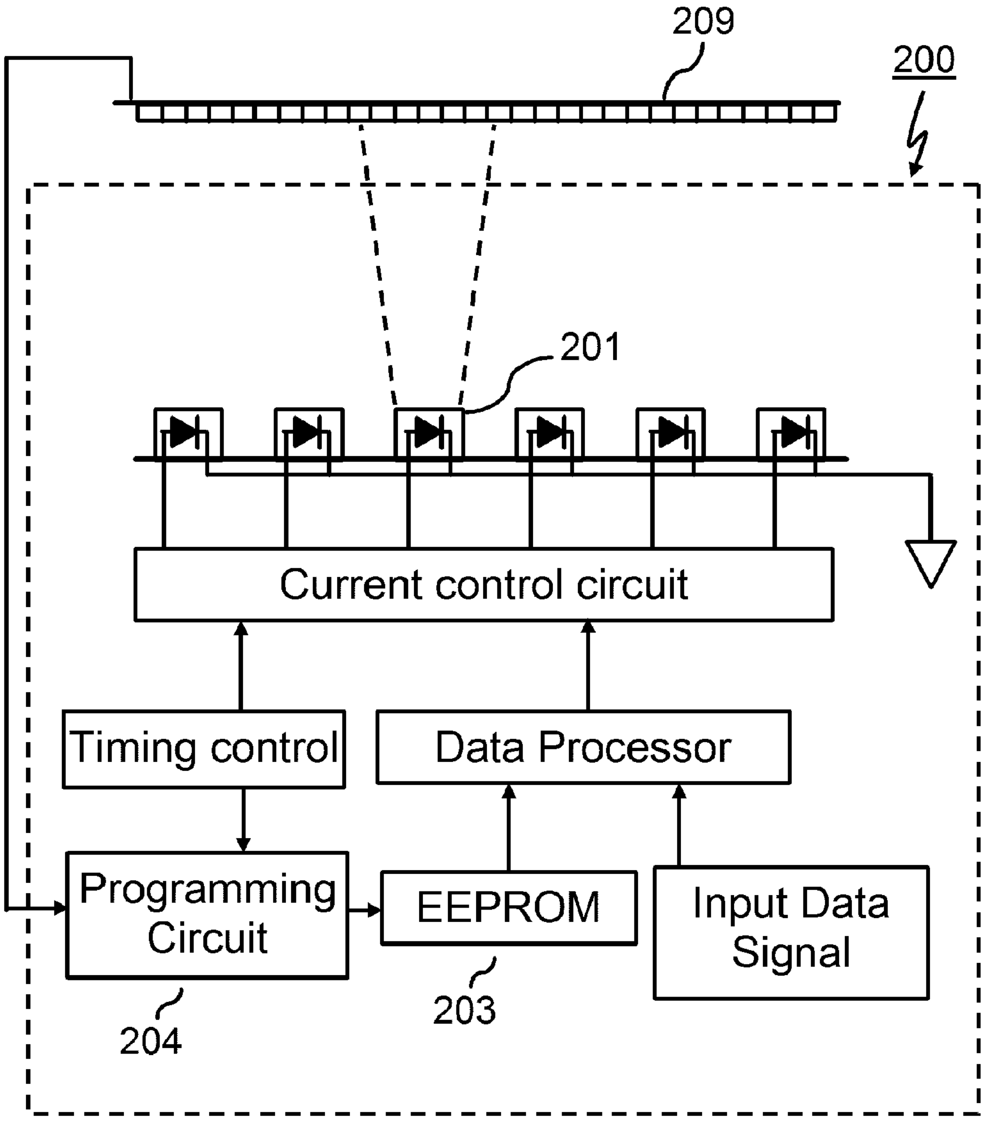
FIG. 2 is the schematic diagram of a preferred embodiment of the present invention.
Figure 2A:
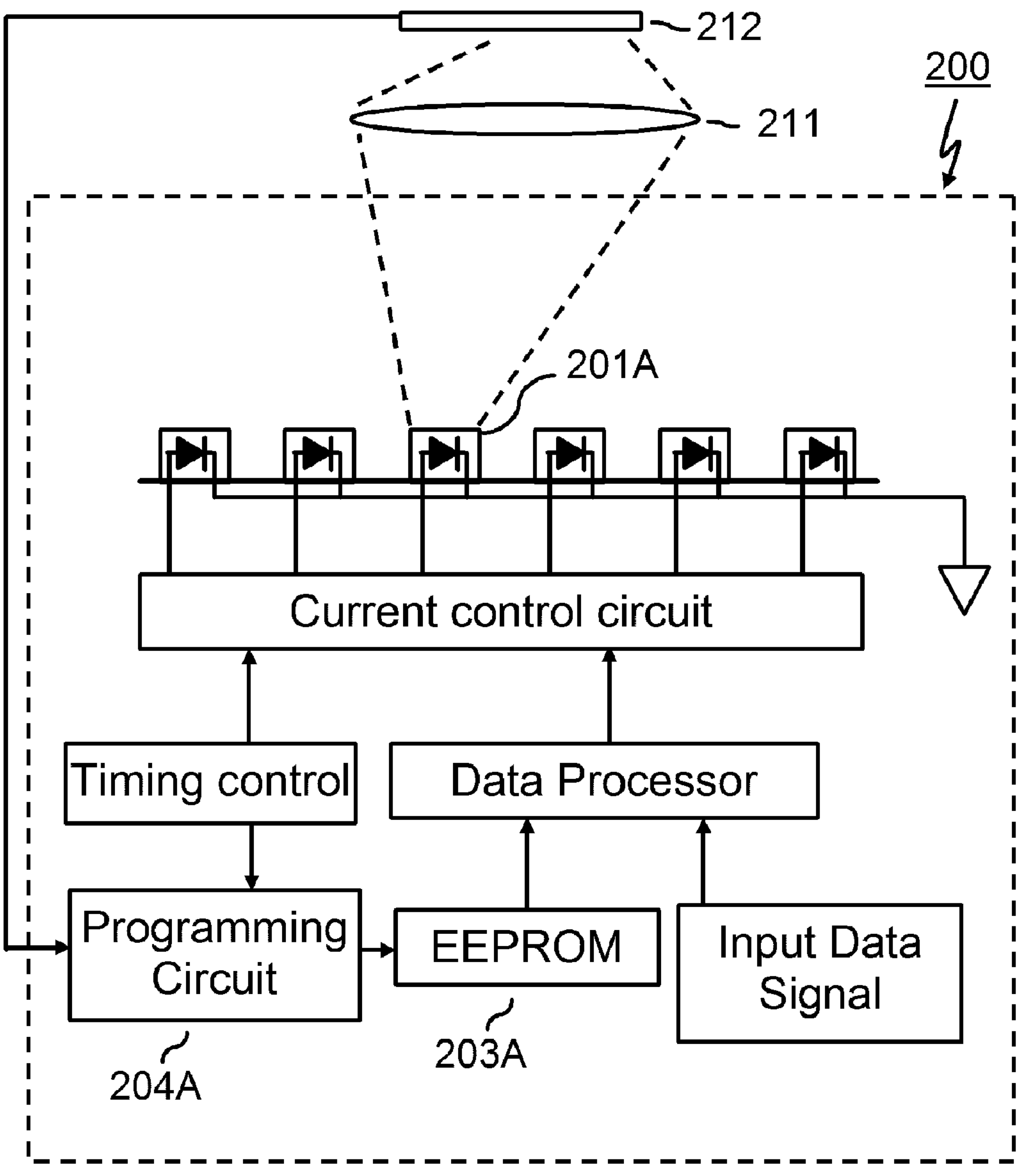
FIG. 2A is the schematic diagram of a preferred embodiment of the present invention.

FIG. 2 provides a schematic diagram of further detail of a preferred embodiment of a display system of the present invention. The system 200 further comprises a programming circuit 204 as an input-output interface for writing data into and reading data from the data storage EEPROM. A timing control circuit is provided as a circuit separated from current control circuit to provide timing control to the current control circuit. The same timing control signal is provided synchronously to the programming circuit to synchronize the data writing with the drive current so that the data measured from the sensor 209 is correctly registered to a proper LED at a specific time when such LED is driven at a given current level.

Programming or data recording operation of the data storage device may be performed before or after the assembly of the LED array with the light valve matrix of the display unit. In a preferred embodiment, a communication port is provided for accessing the storage device to program or re-program the reference information. One preferred embodiment of such data storage device is an EEPEOM that may be programmed with software from a computer with one of the computer's port connected to said communication port of the display with a cable. Method of programming an EEPROM is commercially available.

A preferred embodiment for structuring the display and recording the reference information into the data storage device is to provide a communication port to receive data of the reference information. A preferred location for such a communication port is on a side, left side or right side, on the case enclosing the LED array assemble. With this preferred embodiment, an external sensor device may be used to generate intensity data of light output by reading the brightness for each and every light emitting device when it is turned on. The sensor device comprises multiple light sensing elements each generating an intensity reading for its corresponding location. A preferred embodiment for such sensor device is a CCD camera for line or 2-dimensional imaging. This preferred embodiment enables re-programming of the data storage device to update the stored reference information at a later time, and periodically to re-adjust the display as the characteristics of the light emitting devices in the display drifted away from its initial conditions.

In another preferred embodiment where an array of light emitting diode is implemented, a pre-determined pattern is generated for lighting up the LED array. Such pattern may be moved to different location in the array at different time, and the sensor position is referenced to the location of the pattern and synchronized with the drive current control circuit via a timing circuit.

Figure 3:
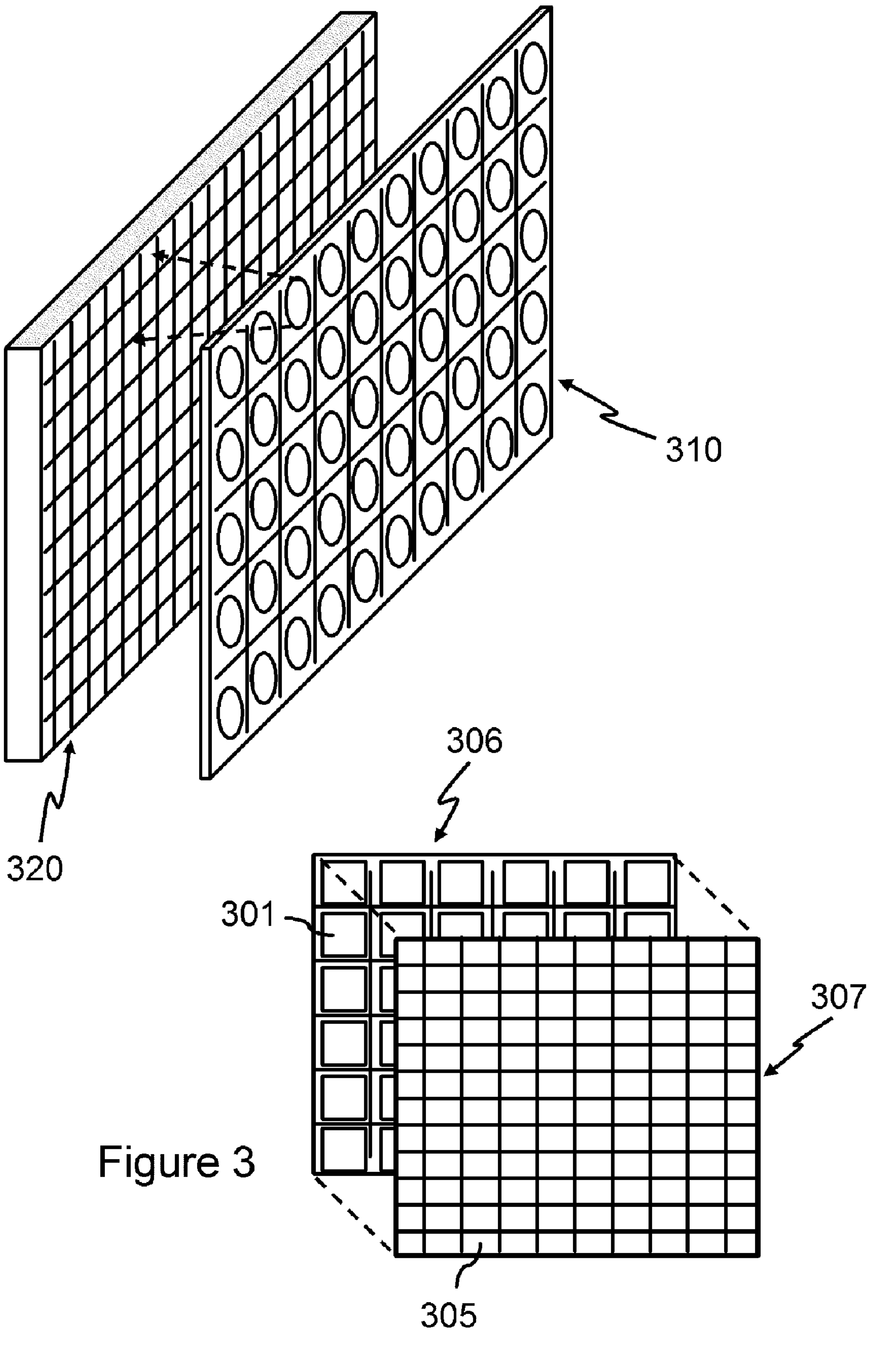
FIG. 3 is a preferred embodiment of the present invention.

FIG. 3 is a preferred embodiment of the present invention wherein the display further comprises a first active matrix 310 comprising an array of light emitting devices and a second active matrix 320 comprising an array of light valves placed in alignment with the light emitting device array 310. A preferred embodiment of light valve array 320 is a LCD panel, and a preferred embodiment of light emitting device array 310 is an active matrix of LEDs. A preferred embodiment of an LED matrix has a current control circuit associated with each light emitting element, either placed in close proximity with the LED element, or in the peripheral of the LED matrix connected thereto via conductive lines such as patterned copper foil on a printed circuit board. The LCD matrix comprises a greater number of elements (pixels) than the LED matrix. A preferred embodiment of the LCD matrix is an active matrix LCD wherein each pixel has a transistor and a storage capacitor.

A preferred embodiment of the light emitting device array comprising organic light emitting diodes formed with a stack of thin films of organic and inorganic materials on a substrate, and wherein the data electrodes and scanning electrodes are fabricated on the same substrate surface providing connections from the OLEDs to the data driver and scan driver respectively.

Another preferred embodiment of the light emitting device array is an array of LEDs in discrete packages, each package comprising single or multiple LEDs. As a preferred embodiment, the LED array is assembled on a connection base board such as a printed circuit board wherein conductive foils are patterned in multiple layers to provide desired circuit connection from each LED to the circuit elements, and to the drivers mounted at the peripheral of the circuit board.

As a further preferred embodiment of the LED array in the present invention, each unit circuit (pixel) associated with an LED in the LED array comprises a drive transistor to modulate the drive current according to a data signal, a select transistor selecting said pixel to receive such data signal, and a storage element holding said data signal for an extended period of time when the input signal is isolated from the pixel by turning off the select transistor. An example of a preferred embodiment of such a pixel circuit is provide in FIG. 4, wherein a transistor 402 modulates the current directed to the LED 405 according to a data information stored in storage capacitor 404. The data information is written into the storage capacitor 404 from a data electrode when a data control transistor 403 is selected by the scan electrode 410. Such active circuit may be placed in the close proximity of the LED elements, or at a distant location such as the peripheral of the array connected thereto by conductive lines.

As a further example of a preferred embodiment, the LEDs may be assembled in packages before placed into circuit. Each LED package may comprise single or multiple LED elements. A package may also comprise LED elements of different colors.

Figure 5:
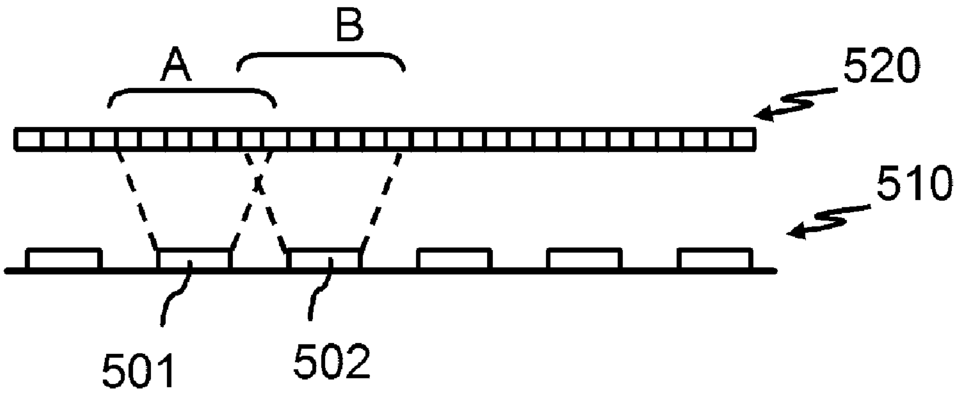
FIG. 5 is an illustration of a display structure of the present invention.
Figure 6:
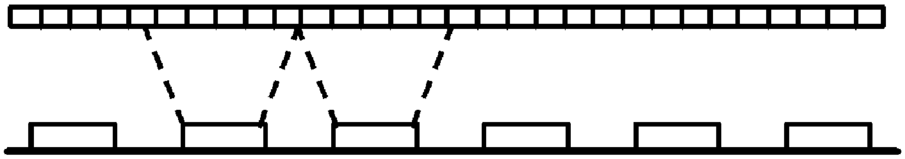
FIG. 6 is an illustration of a display structure of the present invention.

FIG. 5 provides an illustration of a preferred arrangement of the LED array wherein the areas on the second matrix of LCD illuminated by two adjacent light sources (LEDs) overlap each other. In FIG. 5, area A is an area of LCD panel (second matrix) illuminated by the light emitting device 501, and area B is an area on LCD illuminated by light emitting device 502. The two areas may overlap as shown in FIG. 5, or closely join with a narrow seaming region as shown in FIG. 6.

For a preferred embodiment of a display comprising a first array of light emitting devices and a second array of liquid crystal light valves, such preferred embodiment may further comprise a first data storage device storing first reference information corresponding to the intensity of the light emitting devices. Such preferred embodiment may further comprise a second data storage device storing a second reference information corresponding to light intensity exiting the second matrix of LCD light valves. Such second reference information comprises data points corresponding to the pixels in the second matrix. In a preferred embodiment, said data points comprise data corresponding to light intensity exiting each and every pixel in an area illuminated by one light emitting device. In a preferred embodiment, said second reference information stored in said second data storage device further comprises a plurality of groups of data, each group of data comprises data points corresponding to light intensity exiting each and every pixel in an area illuminated by one light emitting device. The density of data points may be varied. For example, in another preferred embodiment, one said group of data may comprise data points corresponding to the light intensity exiting every other pixels of the second matrix of liquid crystal light valve in an area illuminated by one light emitting device. The density of data points may also vary from location to location or according to the sensitivity. For example, in another preferred embodiment, in one said group of data corresponding to an area illuminated by a light emitting device, the density of data points in the center region of the illumination where the intensity is more uniform is set to be lower than the density of data points near the edges where the intensity varies rapidly. For example, the reference information of a group of data comprises data points every corresponding to every 9 pixels in the center region, and every pixels near the edge of the illuminated area. As illustrated in an example of FIG. 7 where intensity of light exiting the light valve is plotted along on direction, area A corresponds to an area illuminated by one light emitting device. The intensity profile is high and slow-varying in the center region, and rapidly drops to the negligible background at the edge. The low density reference data may be stored for the plateau and a high density, such as every pixel, intensity profile is stored.

Figure 7:
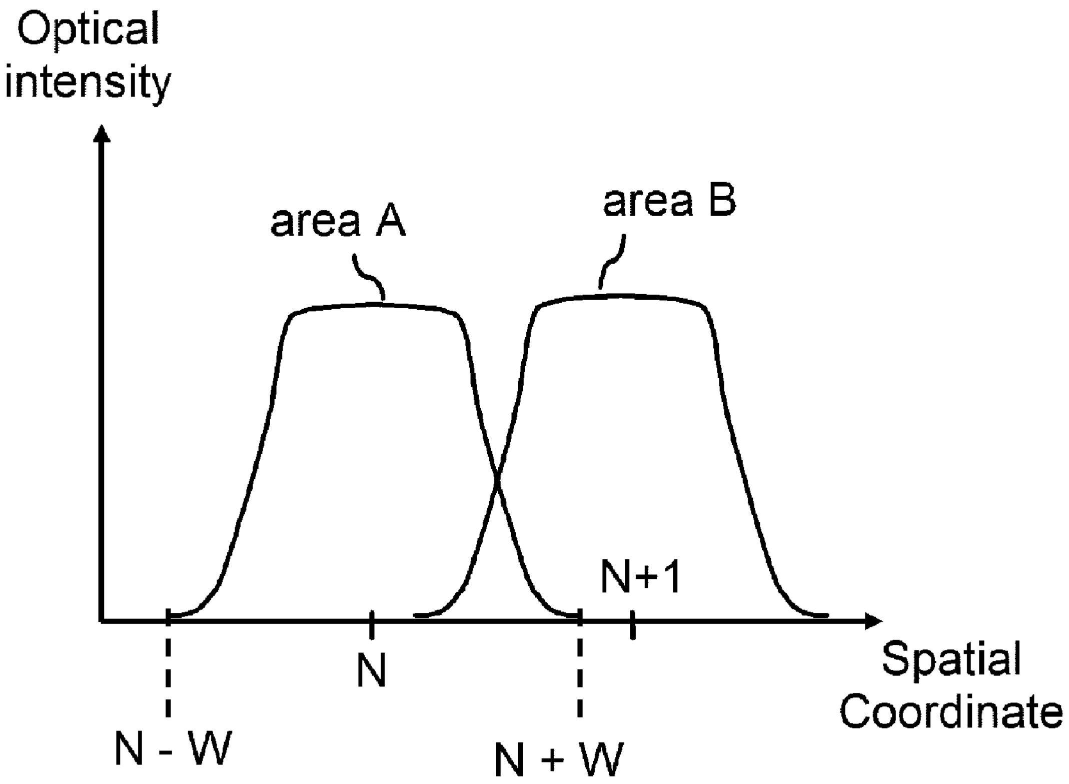
FIG. 7 is an illustration of the present invention.

In a preferred embodiment of the data storage device and data structure for reference information, the data comprises a plurality of groups, wherein each group comprises data points corresponding to an area illuminated by a light emitting device. For example, the group N of data comprises data points corresponding to pixels from N−W to N+W in area A as illustrated in FIG. 7, and group N+1 comprises data points corresponding to N+1−W to N+1+W in area B, where areas A and B are two adjacent area illuminated by two adjacent light emitting devices.

In a preferred embodiment of the present invention, the reference data for a display comprising a first array of light emitting devices and a second matrix of light valves such as LCD is obtained by placing an optical sensing device to measure the light intensity exiting the light valves. In a preferred embodiment, said first reference information comprises a data value for a light emitting device corresponding to the maximum measured intensity of light exiting the light valves in the area illuminated by said light emitting device. In another preferred embodiment of the present invention, the first reference information comprises a data value for a light emitting device corresponding to the measured intensity of light exiting the light valves in the area illuminated by said light emitting device set at a specified state, wherein said state corresponds to a scale of light output of the light emitting device. In a preferred embodiment, the measurement of light exiting the light valve is performed while setting all light valves at the highest transmission level. In another preferred embodiment, the reference information further comprises data value corresponding to a measurement while setting the light valves in an area to the lowest transmission level. In a preferred embodiment, the measurement of light exiting the light valves in one area illuminated by a light emitting device is performed while setting all other light emitting device to off or the lowest lighting state.

Figure 8:
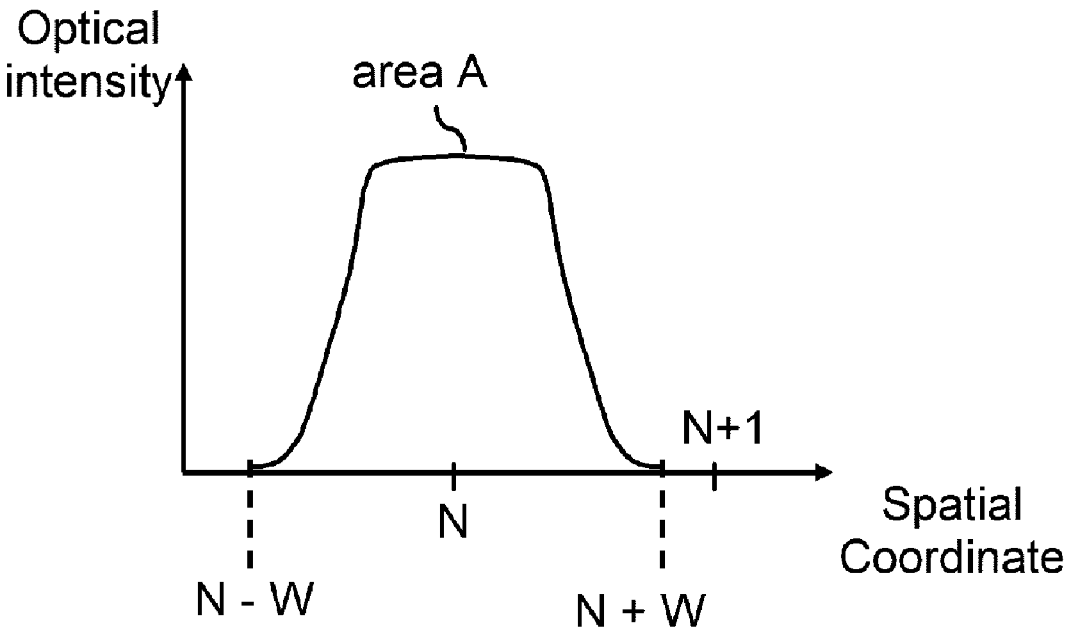
FIG. 8 is an illustration of the present invention.

An example of the measured reference information is illustrated in FIG. 8, wherein only the light emitting device whose profile is being record is turned on, and the rest of the devices are turned off. The profile shown represents the light intensity at various locations along the spatial coordinate along one direction of the matrix.

In the present invention, a preferred embodiment of obtaining the second reference information for the light valve matrix is placing an optical sensing device to measure the light intensity exiting the light valves while turning on only one light emitting device whose illumination area is measured.

Figure 9:
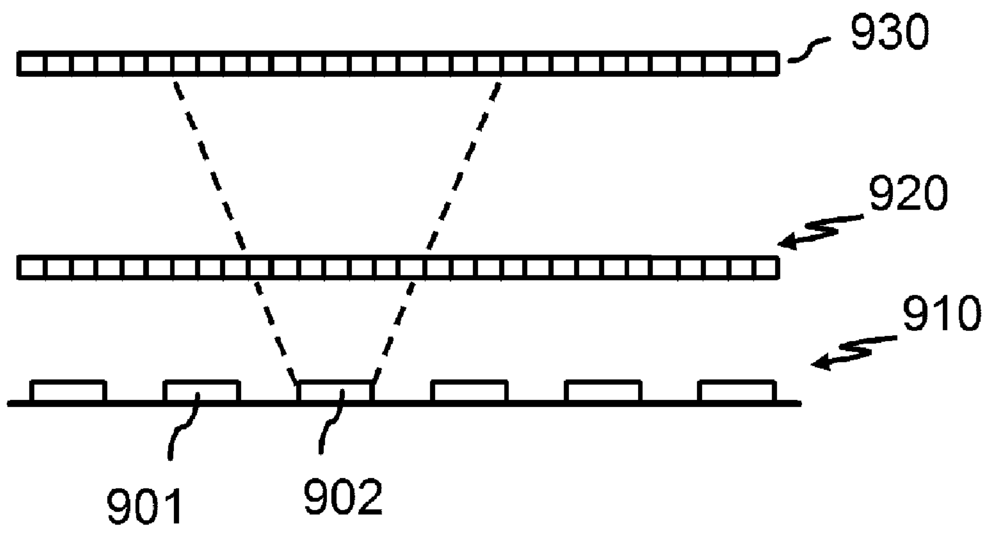
FIG. 9 is a preferred embodiment of the present invention.

FIG. 9 provides an illustration of a preferred embodiment of the recording method and apparatus wherein a display comprises an array of light emitting devices 910, and an LCD panel comprising an array of light valves 920. The optical sensing device 930 is placed after LCD to record the light intensity passing through the LCD array where all the light valves are turned on, and only one light emitting device 902 is turned on while all other light emitting device, such as 901, are turned off. The optical data measured by the array of optical sensing device 930 is processed to provide both the area intensity information as used for the first reference information, and pixilated data representing each and every pixel of the light valves in the area illuminated by each and every light emitting device, to be used as second reference information.

Figure 10:
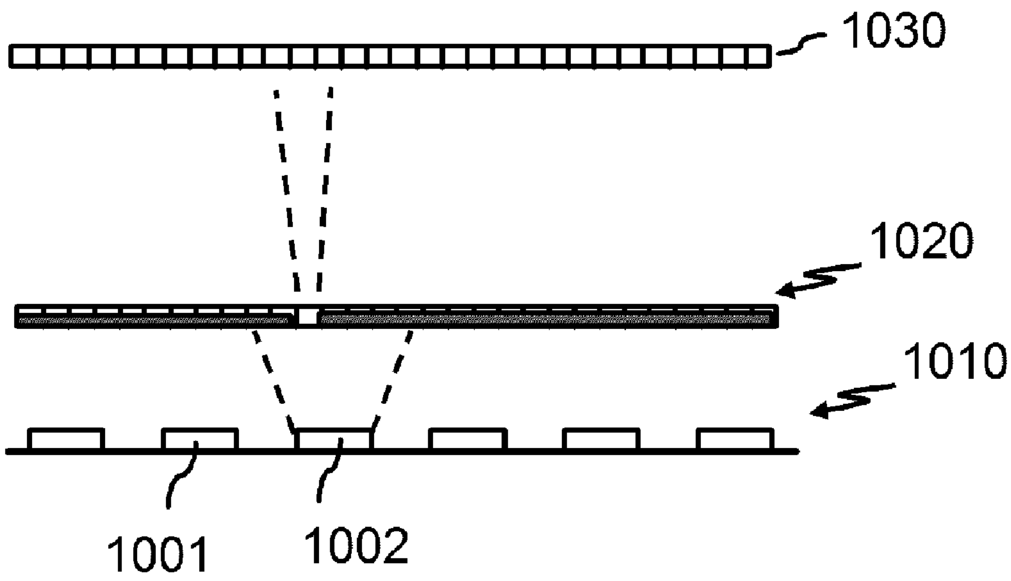
FIG. 10 is a preferred embodiment of the present invention.

Another preferred embodiment of the measuring method and apparatus is provided in FIG. 10, wherein a display comprises an array of light emitting devices 1010, and an LCD panel comprising an array of light valves 1020. The optical sensing device 1030 is placed after LCD to record the light intensity passing through the LCD array where the light valves are turned on one at a time to allow a sequential recording of light intensity passing through the corresponding light valve which is turned on by a timing controller, and only one light emitting device 1002 is turned on while all other light emitting device, such as 1001, are turned off. This recording process repeats one light emitting device at a time, for all light emitting devices. The optical data measured by the array of optical sensing device 930 is processed to provide both an area intensity information as used for the first reference information, and pixilated data representing each and every pixel of the light valves in the area illuminated by each and every light emitting device, to be used as second reference information.

One preferred embodiment for the optical sensing device is a CCD camera that has array of pixels covering at least an area illuminated by a light emitting device. Another embodiment of the present invention of the optical sensing device is a CCD camera comprising an array of pixels covering the entire array of the light valves. Another preferred embodiment of the optical sensing device is a device comprising a lens and an optical sensor, such as a photo detector. An example of the photo detector is a photo diode.

Figure 11:
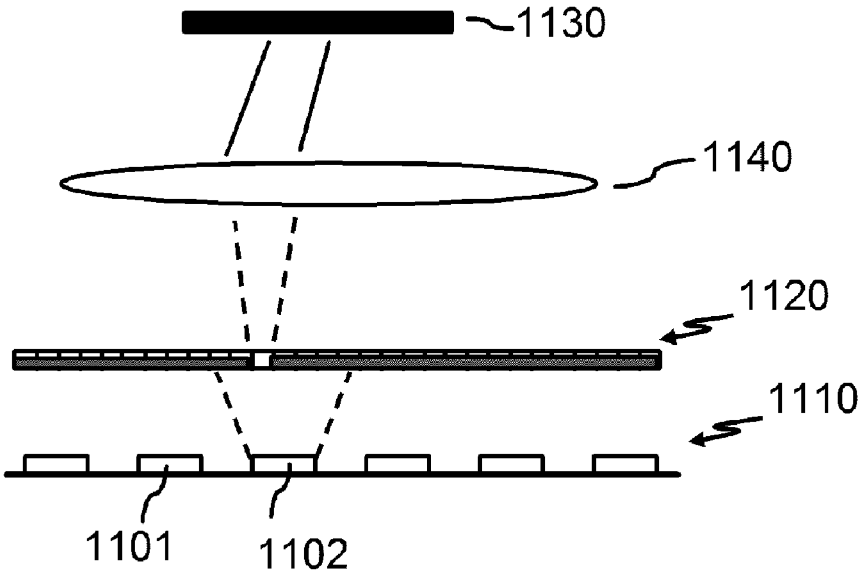
FIG. 11 is a preferred embodiment of the present invention.

Another preferred embodiment for the reference recording device is provided in FIG. 11, where and optical device 1140, such as a lens, is used to project the light output to an optical sensor 1140. In this preferred embodiment, the pixel is turned on one at a time sequentially. The recording is performed one light emitting device at time, and repeat for all light emitting devices.

Figure 12:
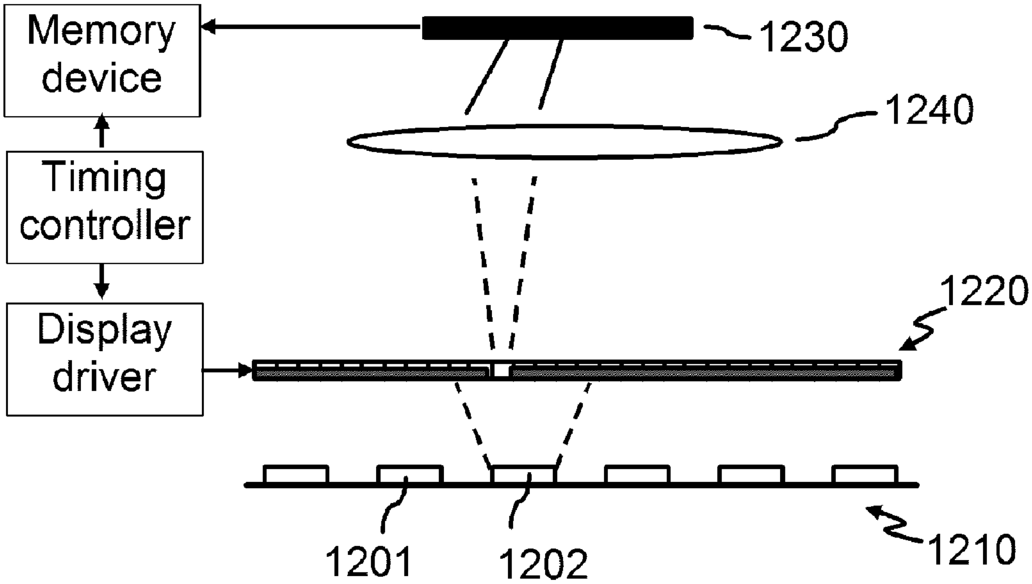
FIG. 12 is a preferred embodiment of the present invention.

In a further preferred embodiment of the present invention, the optical sensing device used for record the reference information comprises a timing controller as illustrated in FIG. 12, wherein said timing controller receives timing signal from or sets timing signal for the display device being measured. In a preferred embodiment, the display device comprises an array of light emitting devices 1210 and an array of LCD light valves 1220. The timing controller synchronizes the measured optical signal with the display data signal, wherein the synchronization enables the measuring device to record and register the optical signal for each location of the pixels of the light valve. In a preferred embodiment of the synchronization, the address of data signal that sets the state of a light valve is sent to the timing controller, and the timing controller use such address information to place the measured optical data measured by an optical sensor 1230 into the corresponding location of a data storage device (Memory device). In a further preferred embodiment, said timing controller is integrated with the optical sensing device. In another preferred embodiment, the timing controller is integrated and assembled with the display device being measured comprising a first array of light emitting device and a second array of light valves. In a further preferred embodiment, the data storage device is integrated with said display device.

Figure 13:
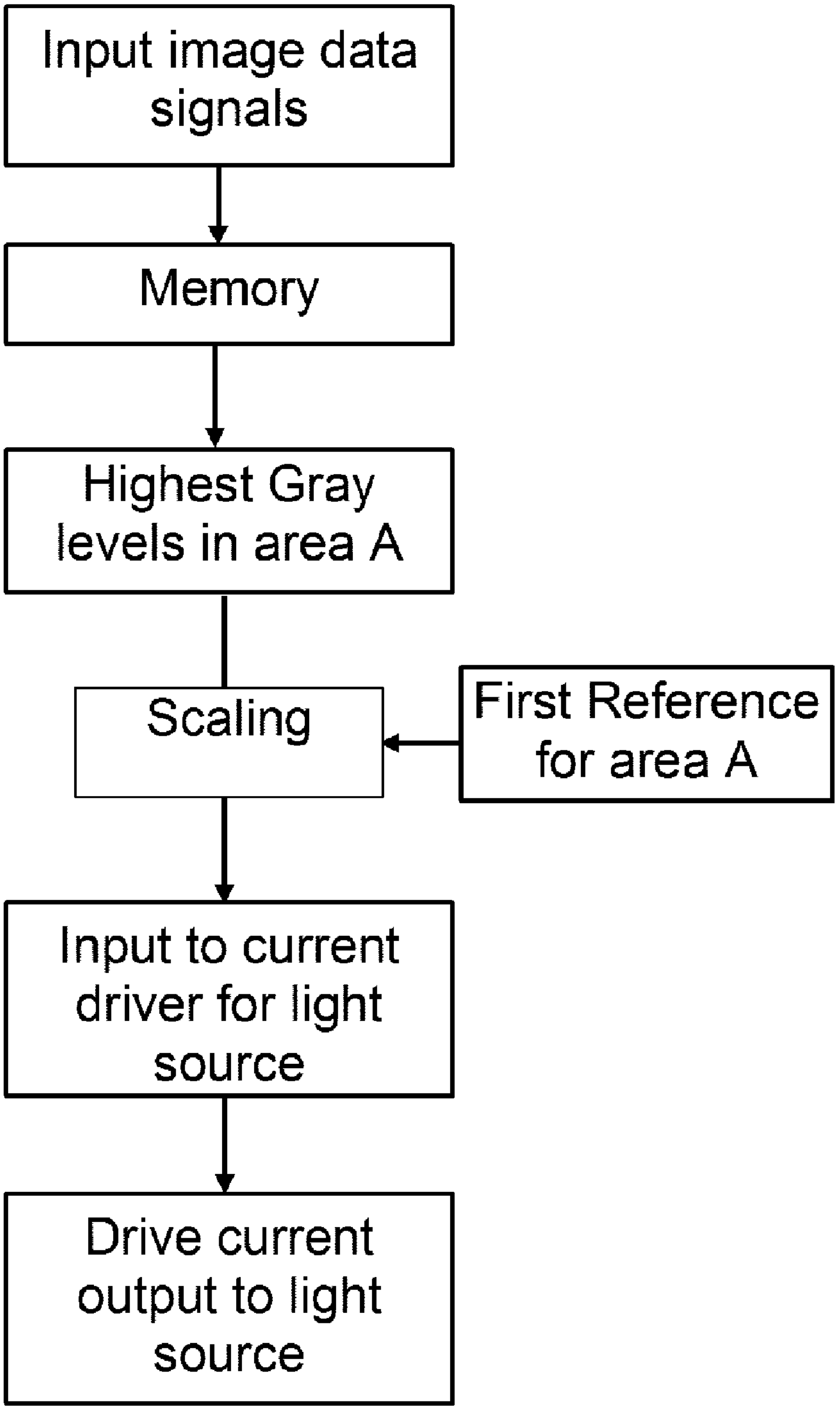
FIG. 13 is a schematics of a preferred embodiment of a method of the present invention.

FIG. 13 provides a preferred embodiment of the drive scheme for the display of the present invention. The input image data signals to be displayed by the display device is first stored in a buffer memory and processed to extract the highest brightness level for the area illuminated by each and every light emitting device. For example, for an area A illuminated by a light emitting device as illustrated in FIG. 5 and FIG. 7, the first reference information recorded for this area is read from the data storage device (such as an EEPROM) to scale the input data corresponding to the this area. The result of the scaling provides the actual intensity information for the area A, and is sent to the current control driver in the lighting control circuit to generate corresponding drive current to drive the light emitting device illuminating area A.

Figure 14:
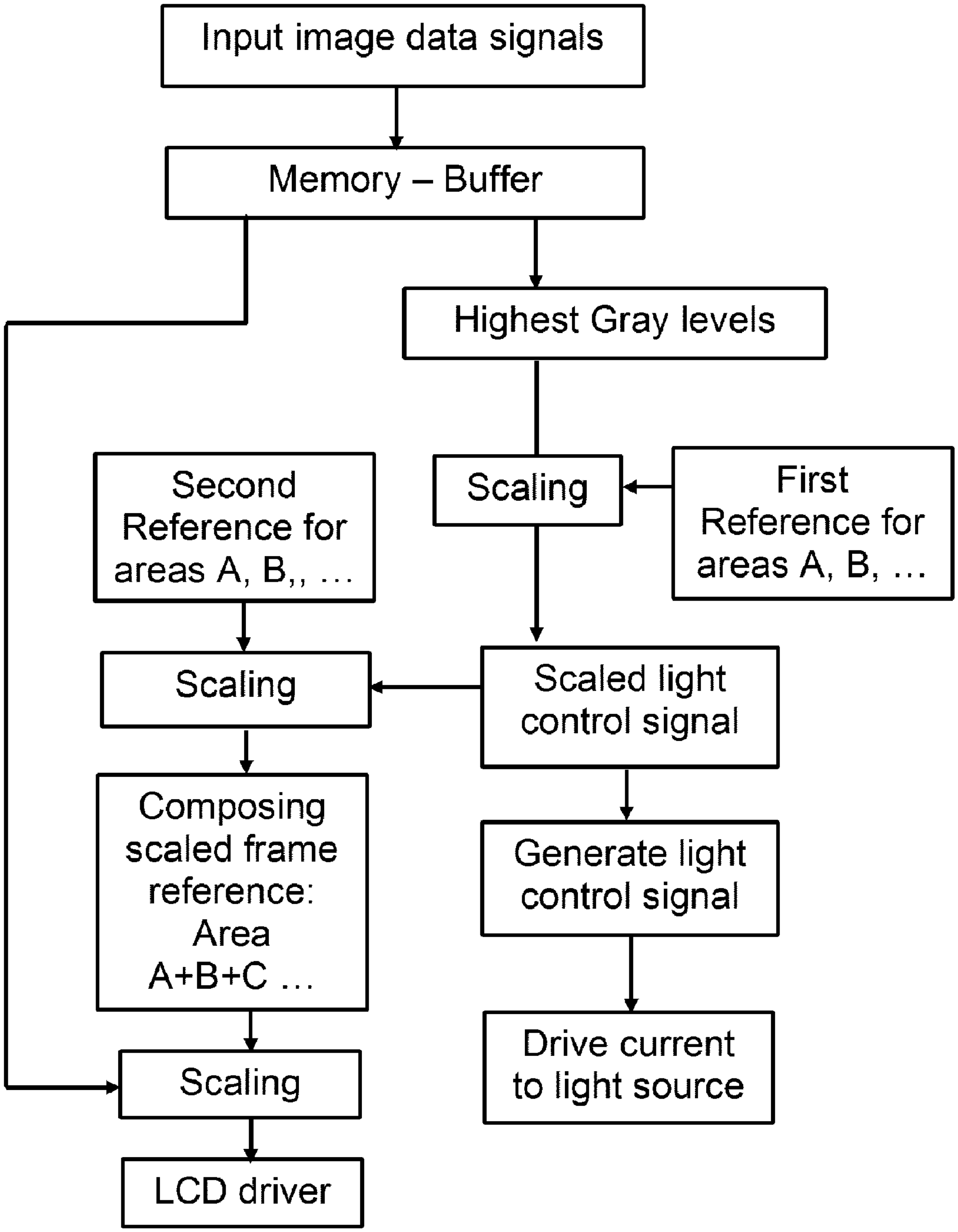
FIG. 14 is a schematics of a preferred embodiment of a method of the present invention.

FIG. 14 provides a preferred embodiment with further detail of the drive scheme for present invention. In parallel with the processing of the lighting control signal, the scaled light control signals resulting from scaling of the highest brightness level with the first reference information for areas A, B, . . . illuminated by each and every light emitting device are directed to scale each and every corresponding group of data in the second reference information. The resulting groups of scaled data corresponding to areas A, B, . . . , are composed to form a composite reference information. A preferred embodiment of the composition is a addition of all groups of data, A+B+C+ . . . . In a typical situation, there are overlaps between each and every two adjacent groups as illustrated in FIG. 5 and FIG. 7. The composite scaled reference information is directed to scale the input image data signal for each and every pixel of the light valves (for example, LCD array). The resulting scaled image data signals represent the signal used for drive the LCD array for displaying the image while the light emitting device delivers a scaled light intensity for each and every area of illumination.

Another preferred embodiment of the present invention comprises a display device comprising: a plurality of light emitting devices; a second addressing means to delivery data information to said plurality of light emitting devices; a scanning means along a first direction, wherein said scanning means along said first direction comprises a first control means for selecting a group of said light emitting devices distributed along a second direction for receiving said data information; wherein said scanning means along said first direction further comprises a second control means for setting a group of light emitting devices distributed along said second direction to a low light or dimming state; wherein said setting a group of light emitting devices distributed along said second direction to the lowest or dimming brightness state precedes said selecting said group of said light emitting devices distributed along said second direction for receiving said data information.

As a further preferred embodiment, said setting a group of light emitting devices distributed along said second direction to the lowest brightness state is followed by selecting said group of said light emitting devices distributed along said second direction for receiving said data information.

Figure 15:
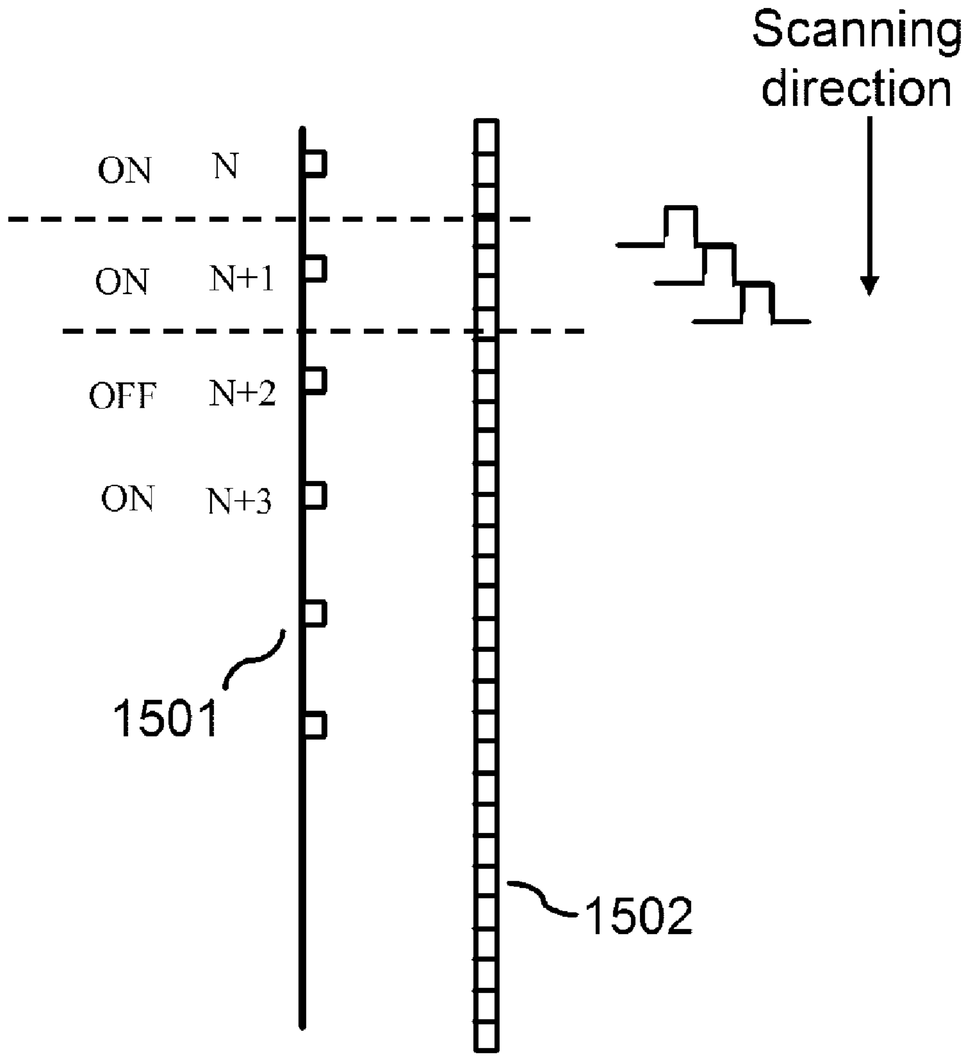
FIG. 15 is a schematic drawing of a preferred embodiment of the present invention.

A preferred embodiment of controlling the LED light output is illustrated in FIG. 15, wherein the LED array 1501 and image display array 1502 is arranged in both the x and y directions. The scanning of image data is along the y-direction, and x axis is perpendicular to the drawing plan. One entire row N+2 along the x direction is turned off first, while during which time the image data is set into the pixels of the Nth region of the light valve matrix. The regions of light valve matrix may overlap each other substantially. Succeeding to setting N+2 row LED off, the control data that set the current of LEDs in the N+2 rows are delivered to the LED driver and the LEDs in N+2 row are turned on according to their data. After turning on the N+2th row of LED, the N+3rd row of LED is turned off. The sequence continues. In such sequence, a section of LEDs is first turned off, and followed by setting current level to said section which turns on said section of LEDs. The next section of LEDs is then set to off or a dimming state.

In conjunction with the LED power sequence, a preferred embodiment of pixel addressing is synchronized so that the pixels illuminated by N+2th LED row receive the refreshing data when the N+2th LED row is in off or dimming state. In such manner, the writing image data to light valve pixels is preceding writing data on LEDs.

Another preferred embodiment for addressing the image data in the present invention may be described using FIG. 15. Before addressing the Nth section of the image pixel array 1502, the entire Nth section is turned to the dark or a dimming state. Following setting the section to a dimming state, the data is scanned into the pixels in starting from the first row within said section. A preferred drive scheme further synchronize the LED's power control in a manner that, after setting said pixels to dimming state, a section (row) of LEDs illuminating a preceding section of said section of image pixels is turned on by writing data into said row of LEDs.

Another preferred embodiment of the present invention comprises a display comprising: a plurality of pixels of light valves such as liquid crystal light valves; a first addressing means to deliver a first data information to said pixels; a scanning means along a first direction, wherein said scanning means along a first direction comprises a first control means for selecting a first group of pixels distributed along a second direction for receiving said first data; wherein said scanning means along said first direction further comprises a second control means for setting a second group of pixels distributed along said second direction to the lowest brightness state; wherein said second group comprises said first group; wherein said second group comprises a plurality of said first groups; wherein said setting a second group of pixels distributed along said second direction to the lowest brightness state precedes said selecting any first group of pixels distributed along a second direction for receiving said first data in said second group of pixels; wherein said selecting said first group of pixels select sequentially said plurality of said first groups in said second group.

As a further preferred embodiment, such display device further comprises: a plurality of light emitting devices; a second addressing means to delivery second data information to said plurality of light emitting devices; a second scanning means along said first direction, wherein said second scanning means along said first direction comprises a third control means for selecting a group of said light emitting devices distributed along said second direction for receiving said second data information; wherein said second scanning means along said first direction further comprises a fourth control means for setting a group of light emitting devices distributed along said second direction to the lowest brightness state; wherein said setting a group of light emitting devices distributed along said second direction to the lowest brightness state precedes said selecting said group of said light emitting devices distributed along said second direction for receiving said second data information.

As a further preferred embodiment, a group of light emitting devices distributed along said second direction illuminates a said second group of pixels, and wherein said setting said group of light emitting devices distributed along said second direction to the lowest brightness state precedes said selecting of any said first group of pixels in said second group of pixels.

As a further preferred embodiment, the selecting of said group of said light emitting devices distributed along said second direction for receiving said second data information is performed at the completion of all said selecting said first groups of pixels in said second group of pixels for receiving said first data information.

Figure 16:
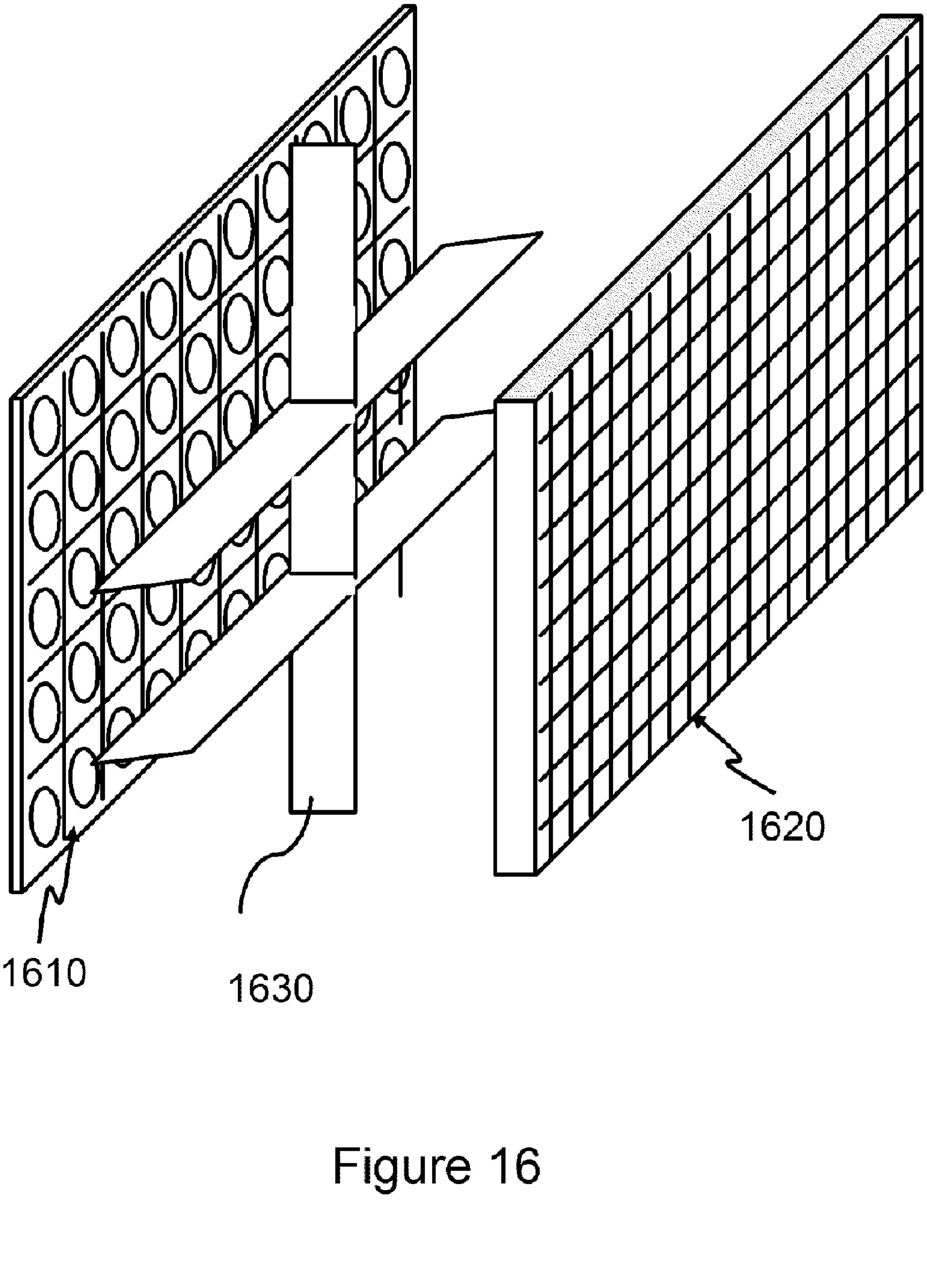
FIG. 16 is a schematic drawing of a preferred embodiment of the present invention.

Another preferred embodiment of the present invention includes a structure of partition to enhance the localization of light source to enhance the operation efficiency. FIG. 16 provide a preferred embodiment of such partition, wherein partition structure 1630 comprising interlaced slices perpendicular to the array of LED 1610 and image pixel array 1620. The surface of the partition is preferably white reflecting surface. Color coating may be applied to the surface to adjust the color output.

Various light emitting devices may be incorporated to form an array of display elements or light source. Such light emitting device include organic light emitting devices such as small molecule OLED and polymer OLED. These light emitting devices my also include such structures and materials as silicon and GaN LEDs, or white LEDs. Such light emitting devices and systems may readily adopt the principles and methods of the present invention, or to include the circuit and drive method directly derived from this invention. Such combinations are conceivably within the scope of the present invention, and the present invention embraces all such applications. It is also conceivable that various types of materials may be used to construct elements for the circuit, and all such variations are embraced by the present invention.

For example, a system comprising a first reference information for scaling the light source and a second reference information for scaling the image pixel data, where both reference information are derived from recording the light output from the display unit, extracting the reference information from such output data, and retaining the information in a data storage device, is specifically described in the present invention. A variation, such as integrating the recording means that record and extract the reference information into the system, or providing a fixed port on the assembled system for future re-adjustment or re-program are all conceivable embraced by the present invention. As another example, for those skilled in the art, it is conceivable that the array of light emitting devices may be constructed by either mounting and connecting discrete LEDs and other circuit elements on a substrate such as a PCB, or by thin film, printing, or spin coating on a rigid or flexible substrate.

Although various embodiments utilizing the principles of the present invention have been shown and described in detail herein, those skilled in the art can readily devise many other variances, modifications, and extensions that still incorporate the principles disclosed in the present invention. The scope of the present invention embraces all such variances, and shall not be construed as limited by the number of active elements, wiring options of such, or the polarity of a light emitting device therein.

(Referring to claim 32) The surface is constructed on a circuit board that support electronic element.

The plan where the light emitting devices are positioned may be affixed in immediate proximity to the second plan along which the light valves are arranged, or is separated at a nominal distance behind the light valve plan. The distance of separation is typically between 2 mm to 30 mm.

What is claimed is:

1. A display device for displaying image according to an image data, comprising an active matrix of light modulators and a plurality of lighting elements; said display further comprising: a data storage device storing a first reference information; a control circuit controlling said modulators according to modulation data and controlling the output of said lighting elements according to lighting control data;

wherein said first reference information further comprising data corresponding to the intensity of light exiting said light modulators;

wherein said control circuit synthesizes said modulation data according to said first reference and said lighting data; said synthesizing further comprising at least one of the operations:

1) multiplication of said reference data by the lighting data of a lighting element; 2) superimposing or adding data resulting from said multiplications from at least two said lighting elements; 3) dividing the input image data by resulting said superimposed data.

2. The display according to claim 1 wherein said synthesizing comprising all three operations performed in sequence.

3. The display according to claim 1 comprising a second storage device storing a second reference information comprising scaling factors corresponding to the output intensity of lighting elements at a pre-determined level of lighting control data.

4. The display according to claim 3 wherein the control circuit further synthesizes lighting control data for a lighting element according to the operations:

1) determining the area brightness level from the input image data for an area corresponding to said lighting element;

2) computing lighting control data for said lighting element by scaling said brightness level with corresponding scaling factor stored in said second reference information;

wherein said area brightness level is the maximum brightness in said area multiplied by a pre-determined percentage.

5. The display according to claim 4 further comprising a memory buffer device storing at least two sequential frames of input image data; wherein said control circuit synthesizing said modulation data leads said synthesizing the lighting data by at least one frame of image data.

6. The display according to claim 3, wherein said second reference information comprising the relative intensity of light exiting said active matrix modulators while a light source is set to a pre-determined output level, and while all pixels of said active matrix are set to either the lowest or the highest output state.

7. The display according to claim 3 wherein said second storage devices is programmable multiple times.

8. The display according to claim 1 wherein said first reference information comprising a relative intensity of light exiting said active matrix of modulators when a light source is set to a pre-determined level and said active matrix modulators are set to either the lowest or the highest output state.

9. The display according to claim 1 wherein said storage device is programmable multiple times.

10. The display according to claim 1, said plurality of lighting elements comprising an active matrix of light emitting devices, wherein each element of said active matrix comprising at least a light emitting device, a drive transistor modulating the current to said light emitting device according to a voltage signal, and a storage element storing said voltage.

11. The display according to claim 1 further comprising:

a control circuit generating a timing signal synchronizing with delivering drive current;

an interface reading signals from a detachable light sensing device;

wherein said control circuit synchronizes delivering of drive current and reading signals from said sensor;

said control circuit determining location address in said storage device for storing signal read from said sensor according to said timing signal.

12. The display according claim 11 wherein said control circuit generates an image comprising a pattern providing a spatial reference to the location of at least one said lighting element, and wherein said control circuit reads said pattern via said sensor according to said timing signal to determine the location of said sensor.

13. The display according to claim 1 wherein said plurality of lighting elements form an active matrix of light emitting elements.

14. An image display device comprising a first 2-dimensional array of image elements and a control circuit performing sequential operations comprising: 1) setting a section of elements to off or a dimming state, and 2) applying data to elements within said section according to image data information;

wherein the duration of the off-state in said operation 1) is within 10 milliseconds.

15. The display device according to claim 14 wherein the duration of combined operations 1) and 2) is shorter than 20 milliseconds.

16. The display device according to claim 15 wherein operation 1) precedes operation 2).

17. The display according to claim 16, said reference data comprising information characteristic to the spatial distribution of the light intensity exiting the light valves corresponding to a said lighting element at a pre-determined lighting level.

18. The display device according to claim 14, said image elements being light emitting elements.

19. The display device according to claim 14, said image elements being light valves.

20. The display device according to claim 14 comprising a first 2-dimensional array of lighting elements and a second 2-dimensional array of light valves.

21. The display device according to claim 14 wherein each lighting element distributes light to a confined area of the light valves; wherein at the far edge of any adjacent area, light intensity decreases to below 1/20 of the highest intensity inside said confined area; wherein said confined area comprises fewer than 1/50 of the light valves.

22. The display according to claim 21 wherein said confined area comprises fewer than 1/200 of the total elements of the light valves.

23. The display according to claim 20 wherein said 2D array of lighting elements is an active matrix, wherein each element comprising a light emitting device, a switching device, and a storage device to retain lighting data.

24. The display according to claim 23 wherein said switching device and storage device are arranged remotely connecting to the light emitting device with conductor lines.

25. The display according to claim 20 wherein a said lighting element comprising a plurality of light emitting devices.

26. The display according to claim 20 wherein each said lighting elements comprising a plurality of light emitting diodes connected in series.

27. The display device according to claim 14, wherein said 2D array of light valves is arranged in parallel with array of lighting elements, further comprising a structure for light confinement, said structure comprising separators between adjacent confinement areas arranged perpendicular to the confined area of light valves and along the boundary of the confined areas.

28. The display according to claim 27 wherein said separator is opaque.

29. The display according to claim 27 wherein said separator comprising reflective surface reflecting light.

30. The display according to claim 27 wherein said separator comprising white surface reflecting broadband spectrum or multiple narrowband spectra.

31. The display according to claim 27 wherein said separator comprising surface reflecting at least one primary narrowband (color).

32. The display device according to claim 27 wherein said separator comprises diffusive reflecting surface.

33. The display device according to claim 14 wherein said a section of pixels comprises a plurality of subsets of pixels, each pixel comprising a light valve; said operation 2) comprising in further detail:

selecting, sequentially, each and every subset of pixels; and applying data to pixels in said subset, when selected, according to data information.

34. The display according to claim 14 further comprising a structure confining the output light of a said pixel of light emitting device to an area of active matrix of light valves; wherein said area comprising fewer than 1/50 of the total pixels of said matrix of light valves; said structure comprising separator between adjacent lighting elements; said separator comprising a surface reflecting light.

35. The display according to claim 34 further comprising a data storage device containing a reference data; said reference data comprising information characteristic to the light intensity exiting the light valves corresponding to a said light emitting device at a pre-determined lighting level.

36. The display according to claim 14 wherein said light emitting device is one of: light emitting diode, thin-film organic light emitting diode.

37. The display according to claim 14 wherein said second storage device comprises one of: a capacitor storing voltage, a plurality of binary devices storing digital data.

38. The display according to claim 14, wherein said second control circuit is arranged in a collection remotely connected to a plurality of the light emitting devices.

39. An image display device comprising: a plurality of light emitting elements; a plurality of light valves modulating light output from said light emitting elements; a control circuit performing cyclic operations comprising: 1) setting a section of light emitting elements to off or a dimming state; 2) applying lighting data to the light emitting elements within said section according to image data information; 3) setting a section of light valves to off or a dimming state; wherein operation 1) precedes 2).

40. The display according to claim 39 wherein the duration of said step 1) is shorter than 10 milliseconds.

41. The display according claim 39 wherein said operations further comprising: 4) applying data to light valves by sequentially selecting and setting the brightness levels to subsections of light valves within said section of light valves according to data information.

42. The display according to claim 41 comprising at least a section of lighting elements illuminating a section of light valves, wherein applying data to said section of light valves is preceded by setting said section of lighting elements to off or a dimming state.

43. The display according to claim 41 wherein said sections of lighting elements and subsection of light valves are in rows, and are arranged in parallel.

44. The display device according to claim 39 comprising at least a section of light emitting elements illuminating a section of light valves, wherein in reference to such said sections, operation 3) precedes or synchronizes with operation 2).

45. The display according to claim 44 wherein applying data to said section of light emitting element is performed within 5 ms after setting said section of light valves to off state.

46. The display according to claim 39 comprising at least a section of lighting elements illuminating a section of light valves, wherein applying data to said section of lighting elements is preceded by setting said section of light valves to off or equivalent dimming state.

47. The display according to claim 46 wherein said applying data to light valves comprising sequentially selecting and setting image data to rows of light valves.

48. The display according to claim 39 comprising at least a section of light valves illuminated by a section of lighting elements; said operations further comprising: 1) setting said section of lighting elements to off or dimming state; 2) setting said section of light valves to off or a dimming state; 3) applying data to said section of light valves; wherein operations 1) and 2) precede 3).

49. The display according to claim 39 comprising at least a section of lighting elements distributing light to a first section and a second section of light valves; said control means further comprising operations: 1) applying image data to said first section of light valves; 2) setting said second section of light valves to off or a dimming state; 3) applying lighting data to said section of lighting elements; wherein operation 2) precedes operation 3).

50. A display device for displaying image data comprising:

a first active matrix comprising a plurality of first select electrodes; a plurality of first data electrodes; a plurality of pixels each comprising a light valve, a first switching device, and a first storage device;

further comprising:

a second active matrix comprising a plurality of select electrodes; a plurality of second data electrodes; a 2-dimensional array of pixels of lighting elements, each comprising a light emitting device and a second control circuit comprising a second switching device and a second storage device;

wherein said light valves modulates light from said light emitting devices according to a modulation data applied to said light valves by sequentially selecting subsets of light valves and writing said data to the storage devices of selected subset;

wherein each said light emitting device emit light according to a lighting data applied to the pixel of lighting element by sequentially selecting said pixel and writing data to the storage devices of selected pixel;

wherein said writing data to a pixel of light valve precedes said writing data to a pixel of lighting element that dispenses light to said a light valve.

51. A display comprising:

a plurality of light emitting devices emitting light according to a drive current;

a control circuit delivers said drive current to said light emitting device;

said display further comprises:

a data storage device storing reference information corresponding to the intensity of light output from said light emitting devices;

wherein said control circuit generates drive current scaling to said reference information; said data storage device being re-programmable multiple times.

* * * * *